3,418,370
PROCESS FOR PREPARING NUCLEAR BROMINATED METHYLENEDIANILINES
Ebenezer A. T. Foster, Cheshire, Adnan A. R. Sayigh, North Haven, and James N. Tilley, Cheshire, Conn., assignors to The Upjohn Company, Kalamazoo, Mich., a corporation of Delaware
No Drawing. Filed Aug. 31, 1965, Ser. No. 484,085
7 Claims. (Cl. 260—570)

ABSTRACT OF THE DISCLOSURE

Bromination of diaminodiphenylmethane, and of mixtures of polyamines containing diaminodiphenylmethane obtained by acid condensation of aniline and formaldehyde, is effected without concomitant formation of undesirable by-products by addition of bromine in the gaseous phase (entrained in an inert gas) to the amine in non-oxidizing mineral acid solution. The brominated amines are useful as intermediates to the corresponding brominated isocyanates which, in turn, are intermediates in the synthesis of fire retardant polyurethanes.

---

This invention relates to an improved process for the preparation of brominated alkylene bis(phenyl amines) and derivatives thereof and is more particularly concerned with the preparation of alkylene bis(phenyl amines) and related compounds which are substituted by bromine in at least one of the aromatic nuclei thereof but which are unsubstituted by bromine in the alkylene bridging groups thereof. The invention is also concerned with the conversion of the aforementioned brominated alkylene bis(phenyl amines), and related compounds, to the corresponding polyisocyanates which are substituted by bromine in at least one of the aromatic nuclei thereof but which are not substituted by bromine in the alkylene bridging groups thereof. The invention is additionally concerned with polyurethane compositions derived from the aforesaid brominated alkylene bis(phenyl isocyanates) and derivatives thereof.

Aromatic diisocyanates and higher polyisocyanates which are brominated in the aromatic nucleus are known to be useful in enhancing the fire retardant properties of polyurethanes prepared therefrom; see, for example, U.S. Patent 2,945,875. Brominated aromatic isocyanates of the above type have been prepared hitherto by direct bromination of the corresponding unbrominated aromatic isocyanate; see, for example, British Patent 971,168 and the aforesaid U.S. Patent 2,945,875.

Such direct bromination methods involve treating the aromatic isocyanate starting material either in the molten state, or in solution in an organic solvent, with liquid bromine. Where the starting isocyanate contains a reactive alkylene residue, as for example, in the case of methylene bis(phenyl isocyanate) and like alkylene bis(phenyl isocyanates) and analogous compounds, the above bromination procedures also result in replacement of one or more hydrogen atoms in the alkylene residue by bromine. The bromo atom or atoms introduced in the alkylene residue are highly reactive and are readily replaceable; see, for example, Holtschmidt, Ang. Chem. International Edition, 1, 633, 1962. For this reason brominated methylene bis(phenyl isocyanate) and like alkylene bis(phenyl isocyanates) prepared by direct bromination as described above, give rise to difficulties when used in the preparation of polyurethanes. The lability of the bromo atom or atoms in the alkylene side chain can lead to side reaction with the polyols and other reactants employed in the preparation of the polyurethane. Additionally the resultant polyurethanes show instability particularly on exposure to light and to moisture due, in the former instance, to the tendency to split out hydrogen bromide and, in the latter instance, to the tendency for the bromo atom to be replaced by hydroxyl.

Accordingly it is desirable to provide methods for the preparation of brominated alkylene bis(phenyl isocyanates) which are free from labile bromine atoms on the alkylene residue. The present invention provides such a method and enables the desired brominated alkylene bis(phenyl isocyanates) to be prepared in excellent overall yields. This is accomplished according to the present invention by means of a novel process which enables the corresponding brominated alkylene bis(phenyl amines) to be obtained free from bromo-substitution in the alkylene residue, which polyamines are then converted to the corresopnding polyisocyanates by phosgenation according to procedures well-known in the art.

The novel process of fthe invention for the bromination of an amine of the alkylene bis(phenyl amine) series without concomitant introduction of bromine into the alkylene bridging group thereof comprises introducing bromine vapor into a solution of the corresponding alkylene bis(phenyl amine) in an aqueous non-oxidizing mineral acid.

The term "amine of the alkylene bis(phenyl amine) series" as used throughout this specification and claims means an amine produced by condensation of (a) aniline, or aniline substituted by one or more inert substituents as hereinafter defined, and (b) an aliphatic aldehyde or ketone in the presence of a mineral acid such as hydrochloric acid in accordance with procedures well-known in the art; see, for example, U.S. Patent 2,683,730, and U.S. Patent 2,950,263. Such procedures generally give rise to a mixture of the corresponding alkylene bis(phenyl amine) and the corresponding trimers, tetramers and higher polymeric products. For example, the condensation of aniline and a carbonyl compound $R_1R_2CO$, wherein $R_1$ and $R_2$ are each selected from the class consisting of hydrogen and lower-alkyl, in the presence of an aqueous mineral acid such as hydrochloric acid, gives rise to a mixture of products which can be represented by the following general formula:

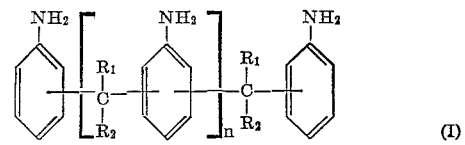

(I)

wherein $R_1$ and $R_2$ have the significance above defined and $n$ is an integer from 0 to 4, inclusive. When $n=0$ the above formula represents the dimeric alkylene bis(phenyl amine). When $n=1$ the Formula I represents the corresponding trimer, when $n=2$, the corresponding tetramer, when $n=3$, the corresponding pentamer and when $n=4$, the corresponding hexamer.

The proportion of dimer to trimer, tetramer, and higher polymeric products in the above polyamine varies according to the nature of the particular aniline and carbonyl compound employed as starting material and also acsording to the relative proportions in which the particular aniline and carbonyl compound are employed. For example, in the case of aniline itself and formaldehyde the use of molar ratios of aniline to formaldehyde as high as 4:1 gives polyamine mixtures containing as much as 85% by weight of methylene-di(aniline); see, for example, U.S. Patent 2,950,263. On the other hand, the use of a molar ratio of aniline to formaldehyde of the order of 4:2.5 gives a polyamine containing approximately 40% by weight of methylenedi(aniline) the remainder of said mixture being the corresponding trimer, tetramer and higher polymers, the proportions of trimer to tetramer to higher polymers, being approximately equal; see, for example, U.S. Patent 2,683,730. Varying proportions of the dimer, trimer, tetramer and higher polymers can be obtained by varying the proportions of aniline to formaldehyde within the above ranges as will be readily appreciated by one skilled in the art.

The individual components of the mixtures of polyamines represented by the Formula I above can be isolated, if desired, by procedures well-known in the art, for example, by chromatography, counter-current distribution, distillation and the like.

As mentioned previously, the aniline which is employed as starting material in the preparation of the alkylene bis(phenyl amine) employed in the process of the invention can be unsubstituted (i.e. aniline itself) or can be substituted by one or more substituents which are inert under the conditions of the bromination process of the invention. Such inert substituents include lower-alkyl, lower-alkoxy, nitro and cyano. The term "lower-alkyl" means methyl, ethyl, propyl, butyl, pentyl, hexyl, and isomeric forms thereof. The term "lower-alkoxy" means methoxy, ethoxy, propoxy, butoxy, pentyloxy, hexyloxy, and isomeric forms thereof.

Where such a substituted aniline is employed as starting material in condensation with a carbonyl compound $R_1R_2CO$, where $R_1$ and $R_2$ have the significance above defined, the resulting mixture of polyamines will be represented by the Formula I above wherein each of the phenyl nuclei contains substituents corresponding to those in the starting amine. The only restriction on the number and nature of substituents in the starting aniline is that at least one of the positions ortho to the amino group be unsubstituted.

In summary, the term "amine of the alkylene bis (phenyl amine) series" is inclusive of (a) the mixtures of polyamines represented by the Formula I above including those wherein the phenyl nuclei are substituted by at least one inert substituent and (b) the individual components of said mixtures. The process of the invention can be applied to the mixtures (b) or to the individual components thereof to produce the corresponding brominated polyamines free from bromo substituents on the alkylene residues.

In carrying out the process of the invention the amine of the alkylene bis(phenyl amine) series is employed in the form of a solution thereof in an aqueous non-oxidizing strong mineral acid. The latter is a class of mineral acid well-recognized in the art and is inclusive of sulfuric, hydrobromic and hydrochloric acids. Hydrochloric aicd is the preferred acid for use in the process of the invention. The non-oxidizing strong mineral acid employed is preferably present in an amount corresponding to 1 equivalent for each equivalent of the alkylene bis(phenyl amine). If desired an amount of acid in excess of the above proportion can be employed. For example, amounts up to and including 2 equivalents of acid per equivalent of alkylene bis(phenyl amine) can be employed, if desired. The upper limit of the amount of acid used is dictated largely by economic factors and is not critical to operation of the process of the invention.

The aqueous solution of the amine of the alkylene bis (phenyl amine) series in the mineral acid can be prepared advantageously and preferably by simply dissolving the starting amine in the appropriate amount of the aqueous mineral acid, or alternatively can be obtained by converting the starting amine to the corresponding acid addition salt, by reaction of the amine and the appropriate amount of mineral acid according to procedures well-known in the art, followed by dissolution of the amine acid addition salt in water.

The concentration of amine of the alkylene bis(phenyl amine) series in the aqueous mineral acid solution can vary over a wide range the precise concentration employed being governed largely by the solubility of the amine acid addition salt in water and also by the economics of the process when operating on a commercial scale, advantageously, the concentration of the amine in the mineral acid solution employed in the process of the invention is within the range of about 5% to about 75% by weight depending upon the water solubility of the amine acid addition salt.

In carrying out the process of the invention bromine in the gaseous state is introduced into the aqueous solution of the amine of the alkylene bis(phenyl amine) series in the non-oxidizing strong mineral acid. Advantageously the bromine is introduced into the amine solution by entrainment of the bromine in air or an inert gas such as nitrogen, argon, krypton, carbon dioxide, and the like followed by passage of the entrained gas through the amine solution. The entrainment of bromine in this manner can be accomplished readily by passing the entraining gas through liquid bromine en route to the reaction vessel. The rate at which bromine is introduced into the amine solution can be controlled conveniently by adjusting the rate of passage of the entraining gas and/or adjusting the temperature at which the liquid bromine, through which the entraining gas is passed, is maintained.

The temperature at which the reaction mixture is maintained in carrying out the process of the invention is advantageously within the range of about 0° C. to about 80° C. and is preferably within the range of about 25 to about 50° C. Operation of the process outside these limits tends to lead on the one hand to excessive loss of bromine when the temperature is above the stated upper limit and, on the other hand, to an undesirably slow rate of reaction in the case of temperatures below the lower limit.

The amount of bromine which is employed in the process of the invention is controlled in accordance with the degree of bromination desired. In general, for each gram molar proportion of bromine employed one gram atom of bromine replaces a hydrogen atom on an unsubstituted carbon atom of the phenyl nucleus and one gram molar proportion of hydrogen bromide is evolved.

We have found that bromination of the starting amine of the alkylene bis(phenyl amine) series will proceed readily until all the free ortho positions (i.e. the positions in the phenyl ring ortho to the amino group which are unsubstituted) and the positions para to the amino, if these are unsubstituted, have been substituted by bromine but further bromination beyond this point will not occur readily. More highly brominated products can be obtained by using an excess of bromine but the reaction is considerably slower than that involving the bromination in the unsubstituted ortho positions.

In general the bromination of an amine of the alkylene bis(phenyl amine) series according to the process of the invention leads to the formation of a mixture of brominated compounds. Thus, as the bromination of starting amine proceeds the brominated amines formed in the reaction mixture compete with the unbrominated starting material in providing sites for further bromination. For example, the reaction of one mole of bromine with one mole of methylenedi(aniline) according to the process of the invention yields a product which is a mixture of the expected monobromo derivative together with significant amounts of the corresponding dibromo, tribromo, and tetrabromo derivatives.

Mixtures of brominated products obtained using the process of the invention can be separated by processes conventional in the art, for example, by chromatography, countercurrent distribution, fractional distillation in the case of liquids, fractional crystallization in the case of solids, or any combination of such procedures. The brominated amine produced according to the invention is first isolated from the product of the reaction by conventional procedures, for example, by basification of the reaction mixture to liberate the free amine from its acid addition salt, followed by isolation of the free amine which separates, for example, by filtration in the case of solids, or solvent extraction in the case of liquids. Where the brominated amine so obtained is a mixture of two or more components said mixture is then separated into its components by conventional procedures as described above.

The brominated amines of the alkylene bis(phenyl amine) series which are produced by the process of the invention are novel compounds which are distinguished by their freedom from bromine substitution in the alkylene residue. The methods previously described in the literature from the bromination of amines of the above type have been found by us to give brominated amines which have a significant content of amine brominated in the alkylene residue. In particular, the process described by Rivier, Helv. Chim. Acta, 12, 865, 1929, for the bromination of 4,4'-methylenedianiline, using liquid bromine in an aqueous solution of the amine dihydrochloride, has been found by us to give a low yield of 4,4'-methylene-bis(2,6-dibromoaniline) contaminated by a red colored material.

The novel brominated amines of the alkylene bis(phenyl amine) series which are produced by the process of the invention can be represented by the following formula:

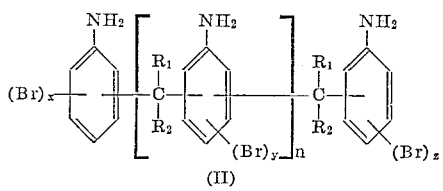

(II)

wherein $R_1$, $R_2$ and $n$ are as hereinbefore defined, $x$ is an integer from 1 to 2, $y$ is an integer from 0 to 2 and $z$ is an integer from 0 to 2, the bromine atoms are present in the phenyl nuclei in a position selected from the class consisting of the positions ortho and para to the amino group in said nuclei, and each of the phenyl nuclei can be additionally substituted by substituents selected from the class consisting of hydrogen, lower-alkyl, lower-alkoxy, nitro and cyano.

The novel brominated amines of the invention include the individual compounds represented by the Formula II and mixtures of two or more of said individual compounds.

It is to be noted that the novel compounds of the Formula II above can also be prepared by condensation of the appropriately brominated aniline with the carbonyl compound $R_1R_2CO$ in the presence of a mineral acid such as hydrochloric acid in accordance with procedures described above. This method however suffers from the serious disadvantage that the brominated anilines required as starting materials are difficult to prepare and are accordingly expensive. In contrast the process of the invention provides a ready path to the novel compounds of the invention from readily available and inexpensive starting materials.

The novel brominated amines of Formula II are useful as intermediates in the preparation of the corresponding isocyanates i.e. the compounds of Formula II wherein each amino group is replaced by —NCO. The latter are also novel compounds which are clearly distinguished from analogous compounds, prepared by direct bromination of the corresponding polyisocyanates, by the absence of bromine substitution in the alkylene residue. The advantages of preparing such polyisocyanates free from bromine-substituted alkylene residue have been discussed above.

The conversion of the brominated amines of Formula II to the corresponding polyisocyanates is carried out by procedures well-known in the art; advantageously the procedure employed is that described by Siefkin, Annalen, 562, 75 et seq., 1949; U.S. Patent 2,683,730, and the like. Illustratively, the free amine of Formula II or an acid addition salt thereof, such as the hydrochloride, hydrobromide, and the like, is treated with phosgene in the presence of an inert organic solvent such as benzene, toluene, xylene, naphthalene, Decalin, chlorobenzene, o-dichlorobenzene, bromobenzene, o-chlorotoluene, kerosene, and the like. The reaction is conducted advantageously at elevated temperatures and preferably at temperatures of the order of 150° C. to 200° C. A two stage phosgenation procedure in which the phosgene and amine are mixed at a lower temperature and the mixture is heated to a temperature within the above range can be employed if desired. The phosgene is conveniently employed in approximately stoichiometric proportions but an excess of phosgene can be employed if desired. The desired polyisocyante is isolated from the reaction mixture by conventional procedures, for example by removal of inert organic solvent, excess phosgene and the like by distillation, to leave the desired polyisocyanate as the residue. The polyisocyanate so obtained can be purified, if desired, for example by distillation, crystallization, chromatography, countercurrent distribution and the like. Where the polyisocyanate is a mixture of two or more components said components can be separated, if desired, by conventional procedures such as those named above.

The novel polyisocyanates so obtained from the novel brominated amines of Formula II are useful in the preparation of polyurethanes and are particularly useful in imparting fire retardant properties to the resulting polyurethanes or in enhancing the inherent fire retardancy of said polyurethanes.

The novel polyisocyanates derived from the novel brominated amines of Formula II can be converted to polyurethanes, both cellular and non-cellular, using procedures well-known in the art; see, for example, Saunders et al. Polyurethane Chemistry and Technology Part II, Interscience 1964. Thus, the novel polyisocyanates, either alone or in combination with other polyisocyanates conventionally used in the art, can be reacted with the appropriate polyol in the presence of catalyst and other additives, and in the presence of blowing agents, where the production of foams is contemplated, to obtain rigid, semi-rigid, and flexible foams, castings, elastomers, supported and non-supported films and the like, all of which products possess enhanced fire retardant properties.

In general the amount of the brominated polyisocyanates, derived from the amines (II), which is employed in preparing fire retardant polyurethanes according to this aspect of the present invention is advantageously such that the resulting polyurethane contains from about 0.1% to about 40% by weight of bromine and preferably from about 1% to about 8% by weight of bromine.

While the novel brominated polyisocyanates of the invention can be applied to the formation of any type of polyurethane, including cellular and non-cellular, they are of particular application in the preparation of cellular polyurethane products. Accordingly, this aspect of the present invention, which is concerned with the formation of novel fire retardant polyurethanes, will be illustrated by reference to the preparation of cellular products. It is to be understood that this aspect of the invention is not limited thereto but is of general application to the preparation of polyurethanes of all types.

The various methods for the preparation of polyurethanes foams are well-known in the art and do not require detailed discussion; see, Saunders, supra.

One of the commonest procedures consists in reacting a polyol, for example, a polyester or polyether, with an organic polyisocyanate and with water, if necessary in the presence of catalysts, surface active agents or other auxiliary agents, whereby simultaneous interaction between the isocyanate, water and the polyol occurs to give the required foam product. This is the so-called "one-shot" procedure. Alternatively the polyol may be reacted with sufficient polyisocyanate to give an intermediate reaction product containing free isocyanate groups and this product, known as prepolymer, is then reacted with water, if desired in the presence of catalyst, surface active agents or other auxiliary agents, in order to produce the final foamed product. This latter is the so called "prepolymer" process. Many variations in the method of carrying out these basic processes are known.

Any of the prior art polyisocyanates conventionally used in the preparation of rigid polyurethane foams can be employed in the process of the present invention. Illustrative of such isocyanates are 2,4-tolylene diisocyanate, 2,6-tolylene diisocyanate, 4,4'-diphenylmethane diisocyanate, dianisidine diisocyanate, tolidine diisocyanate, hexamethylene diisocyanate, m-xylylene diisocyanate, 1,5-naphthalene diisocyanate, and other di- and higher polyisocyanates such as those listed in the tables of Siefken, Ann. 562, 122–135 (1949). Mixtures of two or more of the above isocyanates can be used if desired. Preferred polyisocyanates are products obtained by phosgenation of mixtures of methylene-bridged polyphenyl polyamines obtained by the interaction of formaldehyde, hydrochloric acid, and primary aromatic amines, for example, aniline, o-chloroaniline, o-toluidine, or mixtures thereof. Such polyisocyanates are known in the art, e.g., U.S. 2,683,730; 2,950,263; and 3,012,008; Canada Patent No. 665,495; and German Patent 1,131,877. A particularly preferred polyisocyanate of this type is the polymethylene polyphenyl isocyanate available commercially under the trademark PAPI®.

Similarly any of the prior art polyols conventionally employed in the preparation of foams can be employed in the process of the invention. The polyols conventionally employed in the preparation of polyurethane foams have a hydroxyl number within the range of approximately 180 to approximately 800. The polyols normally used for the preparation of rigid foams are those having a hydroxyl number in the range of approximately 300 to approximately 800.

Illustrative polyols which can be used in the process of the invention are polyethers such as polyoxyalkylene glycols such as the polyoxyethylene glycols prepared by the addition of ethylene oxide to water, ethylene glycol or diethylene glycol; polyoxypropylene glycols prepared by the addition of 1,2-propylene oxide to water, propylene glycol or dipropylene glycol; mixed oxyethyleneoxypropylene polyglycols prepared in a similar manner utilizing a mixture of ethylene oxide and propylene oxide or a sequential addition of ethylene oxide and 1,2-propylene oxide; polyether glycols prepared by reacting ethylene glycol, propylene oxide or mixtures thereof with mono- and polynuclear dihydroxy benzenes, e.g., catechol, resorcinol, hydroquinone, orcinol, 2,2-bis(p-hydroxyphenyl)propane, bis(p-hydroxyphenyl)methane, and the like; polyethers prepared by reacting ethylene oxide, propylene oxide, or mixtures thereof with aliphatic polyols such as glycerol, sorbitol, trimethylolpropane, 1,2,6-hexanetriol, pentaerythritol, sucrose or glycosides, e.g., methyl, ethyl, propyl, butyl, and 2-ethylhexyl, arabinoside, xyloside, fructoside, glucoside, rhamnoside, etc.; polyethers prepared by reacting ethylene oxide, propylene oxide or mixtures thereof with alicyclic polyols such as tetramethylolcyclohexanol; polyols containing a heterocyclic nucleus such as 3,3,5-tris(hydroxymethyl)-5-methyl-4-hydroxytetrahydropyran and 3,3,5,5-tetrakis(hydroxymethyl)-4-hydroxytetrahydropyran; or polyols containing an aromatic nucleus such as 2,2-bis-(hydroxyphenyl)ethanol, pyrogallol, phloroglucinol, tris(hydroxyphenyl)alkanes, e.g., 1,1,3-tris(hydroxyphenyl)ethanes, and 1,1,3-tris(hydroxyphenyl)propanes, etc., tetrakis(hydroxyphenyl)alkanes, e.g. 1,1,3,3-tetrakis(hydroxy-3-methylphenyl)propanes, 1,1,4,4-tetrakis(hydroxyphenyl)butanes, and the like.

A particularly useful polyol for employment in the process of the invention is a polyol mixture comprising a polyol adduct produced by mixing under hydroxyalkylation conditions from 2 to 20 molecular equivalents of ethylene oxide, propylene oxide, or 1,2-butylene oxide, or mixtures thereof, and one amine equivalent of a polyamine mixture, 100 parts of said polyamine mixture containing from 35 to 90 parts of methylene dianilines, the remaining parts being triamines and polyamines of higher molecular weight, said methylenedianilines, triamines, and polyamines of higher molecular weight having been formed by acid condensation of aniline and formaldehyde.

Illustrative of the polyester polyols which can be employed in the process of the invention are those prepared from dibasic carboxylic acids and polyhydric alcohols, preferably trihydric alcohols. The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids may be used also. The polyol component or components of the polyester are preferably trihydric. Examples of suitable polyols include trimethylolethane, trimethylolpropane, mannitol, hexanetriol, glycerine and pentaerythritol. Small amounts of dihydric alcohols such as ethylene glycol, diethylene glycol, 1,2-propylene glycol, 1,4-butanediol, and cyclohexanediol may also be used. In preparing rigid polyurethane foams it is recommended that no more than about 20% of the hydroxyl groups of the polyester used be supplied by a diol. The above polyesters are typical of those which can be employed in the one-shot, but preferably in the prepolymer, methods of foaming using the process of the invention.

In making rigid foams in accordance with the process of the invention it is advantageous to add a hydroxyl terminated crosslinking polyol to the reaction mixture to form the best network for foam formation. Advantageously the crosslinking polyol should have at least 3 hydroxy groups in the molecule and can be added to the foam reaction mix at any point at which the other polyols are added. Examples of such crosslinking polyols are trimethylolpropane, glycerol, 1,2,6-hexanetriol, pentaerythritol, hydroxyalkylated aliphatic diamines such as N,N,N',N'-tetrakis(2-hydroxypropyl)ethylenediamine, N,N,N',N'-tetrakis(2-hydroxyethyl)ethylenediamine, and the like, and alkylene oxide reaction products of sugars such as sucrose, and the like.

In preparing polyurethane foams according to the invention, it is desirable, in accordance with conventional procedures, to employ a catalyst in the reaction of the polyisocyanate and polyol. Any of the catalysts conventionally employed in the art to catalyze the reaction of an isocyanate with a reactive hydrogen containing compound can be employed for this purpose; see, for example, Saunders et al., ibid., volume I, pp. 228–232; see also Britain et al. "J. Applied Polymer Science" 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. The preferred catalysts for use in the process and compositions of the invention are the tertiary organic amines of which the following are representative: triethylamine, triethylenediamine, N,N,N',N'-tetramethylethylenediamine, N,N,N',N'-tetraethylethylene diamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like, or mixtures of two or more such amines. The amount of catalyst employed is generally within the range of about 0.1 to about 2.0% by weight based on total weight of reactants in the polyurethane forming reaction mixture.

The ratio of isocyanate groups to active hydrogen containing groups in the foam mixtures of the invention is within the normal limits employed in the production of polyurethane foams. Thus said ratio is advantageously within the range of from 1.50 to 0.65:1 and preferably within the range of 1.20:1 to 1:1, whether the isocyanate and polyol are employed separately in the one-shot process or whether the two components have been reacted to form a prepolymer. The lower ratio of ranges of isocyanate to active hydrogen group ratio are used where the polyol is highly functional.

The final foam density of the products produced by the process of the invention can be controlled in accordance with methods well-known in the art. For example, this control can be accomplished by regulating the amount of water present in the foam mixture or by using a combination of water and a conventional blowing agent having a boiling point below about 110° C. and preferably below about 50° C. such as a volatile aliphatic hydrocarbon or a volatile highly halogenated hydrocarbon, for example, trichloromonofluoromethane, dichlorodifluoromethane, chlorotrifluoromethane, 1,1-dichloro - 1 - fluoroethane, 1-chloro-1, 1-difluoro-2, 2-dichloroethane and 1,1,1-trifluoro-2-chloro-2-fluorobutane or mixtures thereof.

Optional additives such as dispersing agents, cell stabilizers, surfactants, flame retardants, and the like which are commonly employed in the fabrication of rigid polyurethane foams, can be employed in the process of the invention. Thus a finer cell structure may be obtained if water-soluble organosilicone polymers are used as surfactants. Organosilicone polymers obtained by condensing a polyalkoxy polysilane with the monoether of a polyalkyleneether glycol in the presence of an acid catalyst are representative of those surfactants which can be used for this purpose. The organosilicone copolymer available under the trade name L–5320 is typical of such polymers. Other surfactants such as ethylene oxide modified sorbitan monopalmitate or ethylene oxide modified polypropyleneether glycol may be used, if desired, to obtain better dispersion of the components of the foam mixture.

Other additives such as dyes, pigments, soaps and metallic powders and other inert fillers may be added to the foam mixture to obtain special foam properties in accordance with practices well-known in the art.

The fire retardant polyurethanes produced in accordance with the present invention are useful for the purposes for which polyurethanes are conventionally employed. For example, the rigid and semi-rigid polyurethane foams produced according to the invention are useful for insulating purposes, either as slab stock or in preformed building panels and, because of their ability to hold lubricants and to resist torque, as transmission plates in power transmission systems using fluids, and in similar systems. The flexible foams produced according to the invention are useful for a variety of cushioning, upholstery and like uses. The elastomeric polyurethanes produced in accordance with the invention find application in the preparation of gaskets, flexible tubing and the like.

The fire retardancy of the polyurethanes prepared according to the invention can be enhanced even further, if desired, by inclusion in the reaction mixes employed in the preparation of said polyurethanes, of one or more of the fire retardants conventionally employed in the art. Illustartive of such supplementary fire retardants are the highly halogenated organophosphorus compounds such as tris(2,3-dibromopropyl)phosphate, under the name "Firemaster" T–23P, and the series of chloroethylated phosphorus derivatives available under the generic name of Phosgards.

A particularly advantageous method of supplementing the fire retardant properties of the polyurethanes of the invention is to replace part of the polyol employed in making the polyurethane by a phosphorus-containing polyol such as the products available commercially under the trade names FR–P8, Vircol 82 and Vircol 638 and Fyrol 6.

While any of the novel brominated polyisocyanates of the invention can be used in the preparation of fire retardant polyurethanes we have found that those brominated polyisocyanates which are derived by phosgenation of the corresponding mixture of brominated amines having the Formula II wherein said mixture contains from about 45 to about 60% of the dimer [i.e. the compound of Formula II, wherein $n=0$ the remainder of said mixture being trimers, tetramers, and higher polymers], can be used to prepare rigid polyurethane foams, using the procedures described above, which foams possess outstanding properties in respect of fire retardance, structural strength, and stability, and thermal insulating capacity.

Further those brominated polyisocyanates of the invention which are derived by phosgenation of the corresponding mixture of brominated amines having the Formula II wherein said mixture contains from about 65% to about 75% of the dimer i.e. the compound of Formula II wherein $n=0$, the remainder of said mixture being trimers, tetramers and higher polymers, can be used to prepare flexible polyurethane foams, using the procedures described above, which foams possess outstanding properties in respect of fire retardance, structural strength and stability, compressibility and uniformity of cells.

The polyurethanes prepared as described above from the novel brominated polyisocyanates of the invention, which are substantially free from bromination in the alkylene residue, possess marked superiority in stability to light and moisture on storage compared with brominated polyisocyanates derived by direct bromination of the corresponding non-brominated polyisocyanates using prior art methods.

The following prepaartions and examples describe the manner and process of making and using the invention and set forth the best mode contemplated by the inventors of carrying out the invention but are not to be construed as limiting.

Example 1

A total of 495 g. (2.5 mole) of 4,4'-methylenedianiline was dissolved in a mixture of 500 ml. (6 mole) of concentrated hydrochloric acid and 7500 ml. of water. The resulting solution was stirred, at an initial temperature of 24° C., while a stream of nitrogen containing entrained bromine vapor was passed into the solution at a rate of 1470 mls. per minute. The bromine was entrained in the nitrogen stream by passing the latter through liquid bromine en route to the reaction vessel. The nitrogen stream containing bromine vapor was maintained until a total of 1600 g. (10 mole) of bromine had been passed into the amine solution; time required, 5 hrs. 35 minutes. During the addition of the bromine the temperature of the reaction mixture rose to a final level of 46° C. After the addition of bromine was complete the reaction mixture was stirred for a further 1 hr. before being made alkaline by addition of 1400 g. (17.5 mole) of 50% by weight aqueous sodium hydroxide solution. The resulting suspension was filtered and washed with water. The insoluble material so isolated was suspended in water and the pH of the suspension was adjusted to 5.0 to 6.0 by the addition of hydrochloric acid. The resulting suspension was then adjusted to pH 7.0 to 8.0 by addition of sodium bicarbonate before being filtered. The insoluble material was washed with water on the filter and dried. There was thus obtained 1272.4 g. (98.9% theoretical yield) of 4,4'-methylene di(2,6-dibromoaniline) having a melting point of approximately 280° C. (with decomposition) after commencing to sublime at 215° C.

*Analysis.*—Calcd. for $C_{13}H_{10}N_2Br_4$: C, 30.83; H, 1.96; N, 5.45; Br. 62.26. Found: C, 30.51; H, 2.11; N, 5.74; Br. 62.51.

The above compound showed no detectable content of ionisable bromine.

Example 2

A solution was prepared by dissolving 416 grams (4 equivalents) of a mixture containing 50% by weight of methylenedianiline, the remainder of said mixture being triamines, tetramines and polyamines of higher molecular weight (said mixture having been prepared by condensing aniline and formaldehyde in the molar proportion of approximately 4:2.26 in the presence of hydrochloric acid following the procedure of U.S. Patent 2,683,730) in a mixture of 480 g. (4.8 mole) of concentrated hydrochloric acid and 3000 ml. of water. The resulting solution was cooled to approximately 25° C. and stirred while a stream of bromine vapor entrained in nitrogen was introduced beneath the surface of the solution. The bromine was entrained in the nitrogen stream by passing the latter through liquid bromine en route to the reaction vessel. A total of 320 g. (2 mole) bromine was entrained and passed into the amine solution over a period of 2 hrs. 50 minutes. The temperature during the addition rose from an initial value of 25° C. to a final value of 41° C. The addition of a few drops of silicone oil was necessary during the bromination in order to control frothing of the reaction mixture. After the addition of bromine was complete the resulting product was made alkaline by the addition of an excess of 50% aqueous caustic soda solution. The aqueous layer was separated by decantation and the insoluble material, comprising a mixture of brominated methylenedianiline and the corresponding triamine, tetramine and higher polymers, was washed with water before being extracted with 2000 ml. hot chlorobenzene. The chlorobenzene solution was separated from the aqueous layer and dried by azeotropic distillation. One-half of the dried solution of brominated polyamine so obtained was then added dropwise over a period of 30 minutes to a stirred solution of 200 g. (2 mole) of phosgene in 1000 ml. of chlorobenzene. The reaction mixture was maintained at a temperature of approximately 0° C. during the addition. After the addition was complete the resulting mixture was stirred and heated slowly to 50° C. and maintained at this temperature for 2 hours while a stream of phosgene was passed into the mixture. The temperature of the reaction mixture was then raised to 115° C. and maintained thereat for a further 5 hours while the passage of phosgene was continued. Total phosgene added by passage into the reaction mixture was approximately 223 liters. The resulting mixture was then heated under reflux for 4 hours while being purged with a stream of nitrogen. At the end of this time the chlorobenzene solvent was removed by distillation under reduced pressure. There was thus obtained a residue (273.4 g.) comprising a mixture of brominated polymethylene polyphenyl polyisocyanates of which approximately 50% was dimer, the remainder being approximately equal proportions of trimer, tetramer, and higher polymers. This material had an isocyanate equivalent of 170.4 and exhibited the following elementary analysis.

Found: C, 57.90; H, 3.42; N, 8.79; Br, 25.08%.

Example 3

A solution was prepared by dissolving 1040 g. (10 equivalents) of a mixture of polyamines [containing 50% by weight of methylenedianiline, the remainder of said mixture being approximately equal proportions of the corresponding trimer, tetramer and higher polymers; said mixture having been pepared by condensing aniline and fomaldehyde in the molar proportion of approximately 4:2.26 in the presence of hydrochloric acid following the procedure of U.S. Patent 2,683,730] in a mixture of 1020 ml. of concentrated hydrochloric acid and 7500 ml. of water. The solution so obtained was cooled to room temperature (approximately 25° C.) and was stirred while a stream of bromine vapor entrained in nitrogen was introduced beneath the surface of the solution. The bromine was entrained in the nitrogen stream by passing the latter through liquid bromine en route to the reactive vessel. In this way a total of 400 g. (2 mole) of bromine was entrained and passed into the amine solution over a period of 4 hours during which time the temperature of the solution rose to a final value of 34° C. When the addition of the bromine was complete the resulting mixture was agitated for an additional hour before adding sufficient 50% aqueous sodium hydroxide solution to render the mixture alkaline. The upper, aqueous layer of the mixture so obtained was removed by decantation to leave a residue comprising a mixture of brominated methylenedianiline and the corresponding triamine, tetramine and higher polymers. This residue was treated with 4 liters of chlorobenzene and the solution was washed successively with two 2,000 ml. portions of water. The emulsion produced by the second wash was broken by filtration of the mixture. The chlorobenzene layer of the filtrate was separated and the solid isolated by filtration was dissolved in the chlorobenzene solution by warming. The chlorobenzene solution was dried by azeotropic distillation and was then filtered. A one-tenth part of the chlorobenezne solution was removed for analytical and other purposes and the remaining nine-tenths of the solution (containing 1032.3 g. of brominated polyamines) was added dropwise, with stirring, over a period of 45 minutes, to a solution of 900 g. of phosgene in 4,000 ml. of chlorobenzene. The slurry so obtained was stirred and heated slowly to 75° C. at which temperature passage of a stream of phosgene into the slurry was initiated. Passage of phosgene gas into the slurry with heating at 75° C. to 121° C. was continued for 6 hours. The resulting solution was purged with dry nitrogen to remove excess phosgene and hydrogen chloride and the chlorobenzene solvent was removed by distillation under reduced pressure. There was thus obtained 1199.4 g. of a mixture of brominated polymethylene polyphenyl polyisocyanates of which approximately 50% was dimer, the remainder being approximately equal proportions of trimer, tetramer, and higher polymers. This material had an isocyanate equivalent of 174.4, a total bromine content of 11.55% by weight and an ionisable halide content of 0.111%.

Example 4

A slurry of 51.4 g. (0.1 mole) of 4,4'-methylenebis (2,6-dibromoaniline) [prepared as described in Example 1] in 700 ml. of chlorobenzene was dried by distillation until 200 ml. of distillate had been collected. The dry slurry of amine so obtained was cooled to approximately 5° C. at which point 22 g. (0.22 mole) of phosgene was added with stirring. The resulting mixture was stirred for 1 hr. and then was heated slowly to reflux temperature and maintained thereat for 1.5 hrs. during which time a stream of phosgene was passed into the slurry until complete solution was obtained. The product so obtained was purged with nitrogen for 2 hrs. while refluxing was maintained. The hot solution was treated with a small portion of Hyflo (a proprietary filter aid; diatomaceous earth) and filtered hot through a bed of Hyflo. The filtrate was allowed to cool and the solid which separated was isolated by filtration. There was thus obtained 17.7 g. of 4,4'-methylenebis(2,6-dibromophenyl isocyanate) in the form of a crystalline solid having a melting point of 238 to 240° C. after partial melting at 210° C. A further 20.8 g. of this material having a melting point of 235 to 238° C. (after partial melting at 210° C.) was obtained by evaporating the mother liquors to dryness, slurrying the residue with ligroin and isolating the insoluble material by filtration. The total yield (38.5 g.) of 4,4'-methylenebis(2,6-dibromophenyl isocyanate) was 68% of theoretical.

Example 5

A solution of 20 g. (0.2 mole) of phosgene in 1000 ml. of kerosene was maintained at 0° C. with stirring while 51.4 g. (0.1 mole) of 4,4'-methylenebis(2,6-dibromoaniline) [prepared as described in Example 1] was added in a single batch. The mixture was stirred for a further 30 minutes before being slowly heated to 150° C. with stirring and passage of a stream of phosgene. The reaction mixture was maintained at a temperature of 135 to 150° C. for 2 hours with continuous passage of phosgene gas and then was purged with nitrogen for 2 hours at 135 to 140° C. to remove excess phosgene and hydrogen chloride. The hot solution so obtained was treated with 10 g. of Hyflo and 5 g. of activated charcoal before being filtered hot through a bed of Hyflo. The filtrate was cooled to circa 10° C. and the solid which had separated was isolated by filtration. There was thus obtained 35.5 g. (62.7% theoretical yield) of 4,4'-methylenebis(2,6-dibromophenyl isocyanate) in the form of a crystalline solid having a melting point of 238 to 240° C.

*Analysis.*—Calcd. for $C_{15}H_6Br_4N_2O_2$: Br, 56.5. Found: Br, 56.33.

Example 6

Using the procedure described in Example 2 but replacing the mixture of polyamines containing 50% by weight of methylenedianiline by an equivalent amount of a mixture of polyamines containing approximately 70% by weight of methylenedianiline, the remainder of said mixture containing approximately equal proportions of the corresponding trimer, tetramer, and higher polymers, said mixture of polyamines having been prepared by condensing aniline and formaldehyde in the molar proportions of 4.0 to 1.6 in the presence of about 2.3 equivalents of hydrochloric acid, there is obtained the corresponding mixture of brominated polyamines, which is phosgenated using the procedure described in Example 2 to give a mixture of brominated polymethylene polyphenyl polyisocyanates containing approximately 70% of dimer, the remainder being approximately equal proportions of trimer, tetramer, and higher polymers.

Example 7

This example illustrates the use of nuclear brominated alkylenebis(phenyl isocyanates) of the invention in the preparation of fire retardant polyurethane foams.

Two rigid polyurethane foams were prepared, one using as the polyisocyanate a polymethylene polyphenyl polyisocyanate free from bromine and the other using a mixture of the latter polyisocyanate and the brominated polyisocyanate prepared as described in Example 2. The former foam was prepared as follows:

Foam A.—A mixture of 68 g. (0.46 equiv.) of Carwinol–140 (a mixed alkylene oxide condensate of a polyamine; equivalent weight=149), 32 g. (0.21 equiv.) of FRP–8 (phosphoric acid-propylene oxide condensate; equivalent weight 154), 2 g. of DC–201 (an organosilicone polymer surfactant), 1 g. of N,N,N',N'-tetramethyl-1,3-butanediamine, and 0.5 g. of triethylamine was prepared using a mechanical blender. Freon 11–B (modified trichlorofluoromethane) was introduced into the mixture until an overall weight increase of 33 g. was attained. To the resulting mixture was added 98 g. (0.73 equiv.) of PAPI® (polymethylene polyphenyl polyisocyanate, equiv. weight 133) with vigorous stirring, and the mixture so obtained was poured as quickly as possible into an open mold (7"x7"x9") and allowed to rise freely. The resulting foam was cured at approximately 25° C. for 24 hrs.; the physical properties of the foam are shown in Table I.

Foam B.—A mixture of 75 g. (0.50 equiv.) of Carwinol–140, 25 g. (0.16 equiv.) of FRP–8, 2 g. of DC–201, 0.4 g. of N,N,N',N'-tetramethyl-1,3-butanediamine, and 0.4 g. of triethylamine, was prepared using a mechanical blender. Freon 11–B (modified trichlorofluoromethane) was introduced into the mixture until an overall weight increase of 35 g. was obtained. To the resulting mixture was added a mixture of 64.8 g. (0.48 equiv.) of PAPI® and 43.2 g. (0.25 equiv.) of the nuclear brominated polymethylene polyphenyl polyisocyanate, prepared as described in Example 2, with vigorous stirring and the mixture so obtained was poured as quickly as possible into an open mold (7"x7"x9") and allowed to rise freely. The resulting foam was cured at approximately 25° C. for 24 hrs.; the physical properties of the foam are shown in Table I.

TABLE I

|  | Foam A | Foam B |
|---|---|---|
| NCO/OH ratio in foam mix | 1.1 | 1.1 |
| Percent phosphorus | 1.02 | 0.76 |
| Percent bromine |  | 3.44 |
| Density (lbs./cu. ft) * | 1.89 | 1.78 |
| Compressive strength (p.s.i.) (//to rise) * | 32.2 | 29.8 |
| Percent vol. change at 100% relative humidity:* |  |  |
| 158° F. for— |  |  |
| 24 hr | +12.9 | +0.64 |
| 7 days | +22.0 | +0.30 |
| 14 days | +28.0 | +0.02 |
| 100° F. for— |  |  |
| 24 hr | +0.23 | −0.11 |
| 7 days | +1.9 | −0.04 |
| 14 days | +3.0 | −0.30 |
| Percent vol. change at 200° F. dry heat:* |  |  |
| 3 days | +3.8 | −0.66 |
| 7 days | +5.1 | −1.11 |
| Flame test (ASRM 1692–59T): |  |  |
| Distance burned (inch) | 1⅛ | ⅝ |
| Rating | (¹) | (²) |

¹ Self extinguishing.
² Non-burning.
* These tests carried out using the procedures defined in "Physical Test Procedures for Rigid Urethane Foams" published by Market Development Section, Atlas Chemical Industries, Inc., Wilmington 99, Delaware.

The above properties clearly indicate that the replacement of a portion of the unbrominated polyisocyanate used for Foam A by the nuclear brominated polyisocyanate of Example 2 gave a foam (Foam B) with markedly increased fire retardancy without any significant effect on the other physical properties of the foam.

Example 8

This example illustrates the use of nuclear brominated alkylene bis(phenyl isocyanates) of the invention in the enhancement of fire retardant properties of polyurethane foams.

Two rigid polyurethane foams were prepared as follows:

Foam C.—A mixture of 100 g. (0.78 equiv.) of Carwinol–151 (a modified alkylene oxide condensate of a polyamine; equiv. wt.=128), 2 g. of DC–201, 2 g. of N,N,N', N'-tetramethyl-1,3-butanediamine and 2 g. of triethylamine was prepared using a mechanical blender. Freon 11–B was introduced into the mixture until an overall weight increase of 37 g. was attained. To the resulting mixture was added 145 g. (0.83 equiv.) of the nuclear brominated polymethylene polyphenyl polyisocyanate, prepared as described in Example 3, with vigorous stirring and the mixture so obtained was poured as quickly as possible into an open mold (7" x 7" x 9") and allowed to rise freely. The resulting foam was cured at approximately 25° C. for 24 hrs. A sample of the foam was submitted to the flame test set forth in ASTM 1692–59T and was rated as self-extinguishing.

Foam D.—This foam was prepared exactly as described for the preparation of foam C except that the brominated polymethlyene polyphenyl polyisocyanate of Example 3 was replaced by 111 g. (0.83 equiv.) of PAPI®. A sample of the foam so produced was submitted to the flame test set forth in ASTM 1692–59T and was found to burn until completely consumed.

The above differences in flame retardant properties of foams C and D clearly illustrate the marked flame retardancy imparted to polyurethane foams by use of the nuclear brominated polyisocyanates of the invention.

We claim:

1. A process for the nuclear bromination of a polyamine having the general formula:

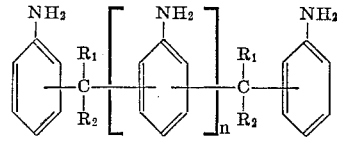

wherein $R_1$ and $R_2$ are each selected from the group consisting of hydrogen and lower-alkyl, and $n$ is an integer from 0 to 4, inclusive, which process comprises introducing bromine vapor into a solution of said amine in an aqueous non-oxidizing mineral acid.

2. The process of claim 1 wherein the bromine is introduced into the amine solution by entrainment in a stream of inert gas.

3. The process of claim 1 wherein the bromine is introduced into the amine solution by entrainment in a stream of nitrogen.

4. A process for the nuclear bromination of methylene dianiline which process comprises introducing bromine vapor into a solution of methylenedianiline in an aqueous non-oxidizing mineral acid.

5. The process of claim 4 wherein the bromine vapor is introduced into the methylenedianiline by entrainment in a stream of inert gas.

6. A process for the preparation of methylene bis(2,6-dibromoaniline) which comprises introducing bromine vapor into a solution of methylenedianiline in an aqueous non-oxidizing mineral acid until approximately 4 molar proportions of bromine for each molar proportion of methylenedianiline have been consumed.

7. The process of claim 6 wherein the bromine vapor is introduced into the methylenedianiline by entrainment in a stream of inert gas.

References Cited

UNITED STATES PATENTS 1,777,266  9/1930  Kalischer et al. _____ 260—570

OTHER REFERENCES

Kouris: "Dyestuffs," vol. 44, No .9, pp. 287–99 (1963).
Rivier et al.: "Chemical Abstracts," vol. 24, p. 357 (1930).

CHARLES B. PARKER, *Primary Examiner.*

ROBERT V. HINES, *Assistant Examiner.*

U.S. Cl. X.R.

52—716; 260—2.5, 45.7, 47, 75, 77.5, 453, 465, 575, 578, 694; 264—54; 285—238